US006078108A

United States Patent [19]

Fröschl

[11] Patent Number: 6,078,108

[45] Date of Patent: Jun. 20, 2000

[54] APPARATUS FOR INTERRUPTING THE FLOW OF CURRENT IN A CABLE

[75] Inventor: Karl Franz Fröschl, Herrnbaumgarten, Austria

[73] Assignee: Kabelkonfektion Gebauer & Griller GmbH, Vienna, Austria

[21] Appl. No.: 09/166,696

[22] Filed: Oct. 5, 1998

Related U.S. Application Data

[63] Continuation of application No. PCT/AT97/00054, Mar. 13, 1997.

[30] Foreign Application Priority Data

Apr. 4, 1996 [AT] Austria ..................................... 613/96
Oct. 29, 1996 [AT] Austria ..................................... 1884/96

[51] Int. Cl.[7] ..................................... H02H 7/18

[52] U.S. Cl. ..................................... 307/10.7; 200/400

[58] Field of Search ..................................... 307/10.1, 10.7; 200/61.08, 400, 453; 337/17, 19, 31, 158

[56] References Cited

U.S. PATENT DOCUMENTS

| | | | |
|---|---|---|---|
| 4,255,629 | 3/1981 | Bell | 200/61.45 |
| 4,342,978 | 8/1982 | Meister | 337/6 |
| 5,535,842 | 7/1996 | Richter et al. | 180/279 |
| 5,621,197 | 4/1997 | Bender et al. | 200/61.08 |
| 5,725,399 | 3/1998 | Albiez et al. | 439/762 |
| 5,818,122 | 10/1998 | Miyazawa et al. | 307/10.7 |
| 5,907,270 | 5/1999 | Branston et al. | 337/12 |

*Primary Examiner*—Jeffrey Gaffin
*Assistant Examiner*—Peter Zura
*Attorney, Agent, or Firm*—Herbert L. Lerner; Laurence A. Greenberg; Werner H. Stemer

[57] ABSTRACT

An apparatus for interrupting the flow of current in a cable, which cable leads from the battery in a motor vehicle to a consumer, also located in the vehicle, such as the starter, engine or the like. A housing is provided, having two connection terminals, electrically insulated from one another, for the lines leading to the battery and to the consumer, and having a switch disposed in the interior of the housing, the switch being assigned a control device which can be tripped by a sensor and whose tripping actuates the switch.

24 Claims, 11 Drawing Sheets

APPARATUS FOR INTERRUPTING THE FLOW OF CURRENT IN A CABLE

CROSS-REFERENCE TO RELATED APPLICATION

This is a continuation of copending International Application PCT/AT97/00054, filed Mar. 13, 1997, which designated the United States.

BACKGROUND OF THE INVENTION

1. Field of the Invention

The present invention relates to an apparatus for interrupting the flow of current in a cable that extends from the battery in a motor vehicle to a consumer that is also located in the vehicle, such as a starter, an engine, or the like.

It is important, for reasons of safety, that the flow of current in an automobile from the battery to a consumer in the vehicle be interrupted in the event of an accident. This is particularly important with regard to the starter. The reason for this is that accident-caused damage to the current-carrying cables can cause short circuits, which in turn can cause fires and explosions.

German utility model DE-GM 84 33 042.2 discloses a device which comprises a housing, formed with a cylindrical recess, that has a first connection terminal and a cylindrical bolt with a second terminal; the bolt can be inserted into the recess and is retained therein by frictional engagement. The cable originating at the battery and the cable leading away to the consumers are connected to the two connection terminals. A charge in the form of a pyrotechnical element that can be tripped by a sensor, is also located in the housing.

In the event of an accident, the sensor outputs a pulse that ignites the charge. By the resultant gas pressure, the bolt located in the cylindrical recess is driven out of the recess, thereby breaking the existing electrical connection between the battery and the consumers.

However, this known device has the disadvantage that because of the frictional engagement of the two coupling parts, both a mechanical connection and an electrical connection is made. In order to assure both a good mechanical connection and a good electrical connection, the coupling parts associated with one another must match exactly, which means high production costs. There is also the danger that the two coupling parts, because of the vibration that occurs during the operation of the vehicle, will come apart. This either increases the junction resistance or completely breaks the electrical connection. By an increased flow of current, welding together of the two coupling parts can also happen, so that the operability of the device is no longer assured. Moreover, from deformations caused by mechanical factors, such as heat warping, the frictional engagement between the two coupling parts can also become so strong that the operability of the device is no longer assured.

SUMMARY OF THE INVENTION

It is accordingly an object of the invention to provide a device for interrupting a current flow in a cable, which overcomes the above-mentioned disadvantages of the heretofore-known devices and methods of this general type and which separates the functions of the mechanical connection and the electrical connection of the two coupling parts and provides for separate components to satisfy the respective function.

With the foregoing and other objects in view there is provided, in accordance with the invention, an apparatus for interrupting a current flow in an electrical cable connecting a motor vehicle battery to a consumer in the motor vehicle, comprising:

- a housing connected in-line in an electrical cable, said housing being formed with terminals which are electrically insulated from one another and at which respective ends of the cable are connected;
- a control device disposed in said housing, said control device electrically connecting the two ends of the cable and being adapted to selectively isolated the two ends from one another; and
- a switch disposed inside said housing and being actuatable by said control device for selectively electrically connecting and disconnecting said two connection terminals.

In other words, the object of the invention are satisfied in be that a housing is provided, having two connection terminals, electrically insulated from one another, for the lines leading to the battery and to the consumer, and having a switch disposed in the interior of the housing, the switch being assigned a control device which can be tripped by a sensor and whose tripping actuates the switch.

Preferably, the control device may be formed by a pyrotechnical element, by the ignition of which the switch is actuatable. Alternatively, the control device may be formed by a compression spring, which is retained in its taut position by means of a meltable wire and which can be tripped by means of a current passing through the meltable wire. Similarly, the control device may be formed by a cylinder and piston unit, which can be tripped by imposition of a compressed gas.

In a preferred embodiment, the housing is embodied with a hollow chamber which is in particular cylindrical and on one end of which the control device is disposed, and in which two contacts, connected to the connection terminals, and a pistonlike switch element, which is displaceable by means of the control device inside the hollow chamber relative to the contacts, are located. The housing may be formed by two sheaths, electrically insulated from one another and comprising electrically conductive material, especially metal, which are each embodied with at least one connection terminal and which surround the hollow chamber. Preferably, the housing is formed by two cylindrical tube segments, each of which is embodied with at least one connection terminal and which are provided with a sheath of plastic, by which they are mechanically joined together and electrically insulated from one another.

In accordance with another preferred embodiment of the invention, the pistonlike switch element is embodied with contact springs on its outside, and a pressure plate, by which the thrust generated by the control device can be transmitted to the switch, is disposed between the control device and the switch element. Preferably, in addition, the housing is embodied on one of its face ends with a detachably secured cover cap, after whose removal a control device can be inserted into the hollow chamber. Moreover, the housing may be embodied with at least one further connection terminal, which is electrically connected to the connection terminal for the cable leading to the battery.

In a further preferred embodiment, the housing is embodied with two spaced-apart rails, which are electrically connected to one another in a first portion of the hollow chamber by means of the switch element, while conversely in a second portion they are electrically insulated from the switch element. Preferably, the rails outside the housing are embodied as connection lugs.

Preferably, the housing is embodied with two spaced-apart rails, between which a switch element is located, and the switch element is assigned an insulating element; its displacement, effected by means of the control device, makes it possible to insulate the switch element electrically from the rails. The switch element may be formed by a helical spring, and that the insulating element may be inserted between the switch element and the rails. In particular, the switch element may be embodied with vanes which are insertable between the rails and the switch element.

In accordance with a concomitant feature of the invention, the housing is formed by two hollow cylindrical housing parts, and one housing part is embodied with a first connection lug. A cylindrical body is located in the interior of the housing and is embodied with a second connection lug. Between the cylindrical body and the housing part embodied with the connection lug, there is provided a switch element, which is adjustable by the control element from a position that electrically connects the two components to a position that electrically insulates these two components from one another. The switch element may be a toroidal helical spring. Moreover, a sleeve of insulating material may be provided between the housing part embodied with the connection lug and a radially protruding flange of the cylindrical body. Furthermore, a groove, in which the switch element, in the electrically conductive position, is retained may be provided if in the inner wall of the housing part embodied with the connection lug.

Other features which are considered as characteristic for the invention are set forth in the appended claims.

Although the invention is illustrated and described herein as embodied in an apparatus for interrupting the flow of current in a cable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
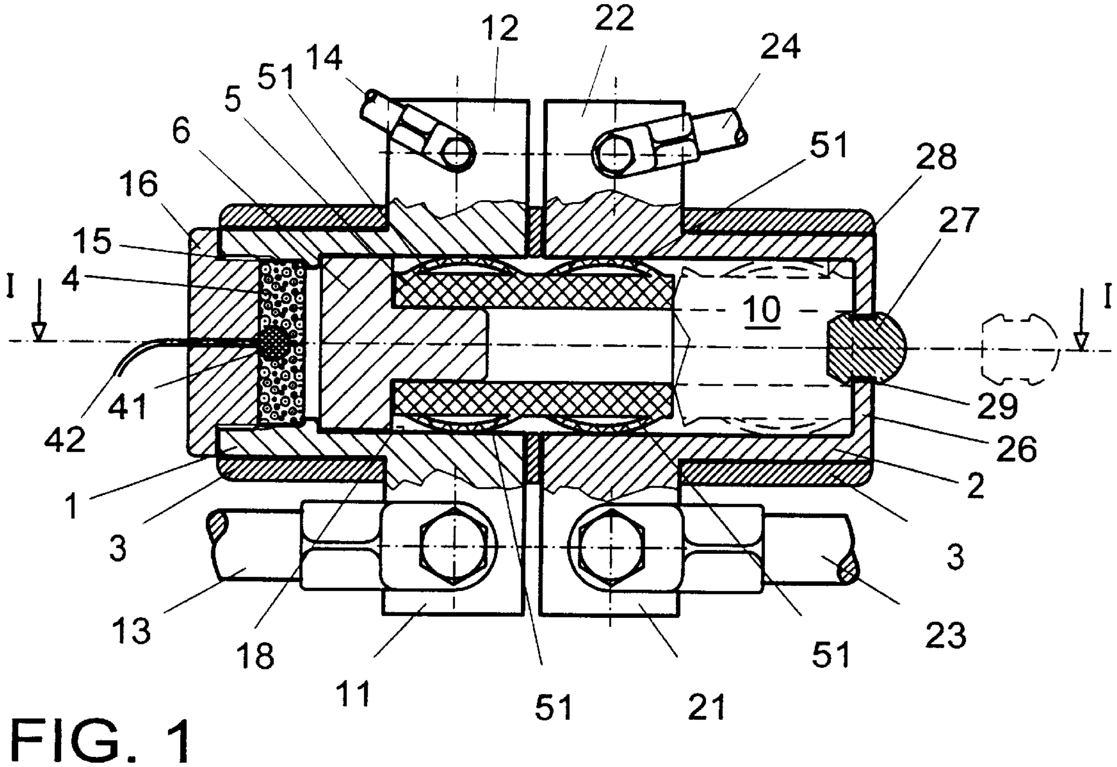
FIG. 1 is a front and axial-longitudinal sectional view of a first embodiment of an apparatus according to the invention.
Figure 1A:
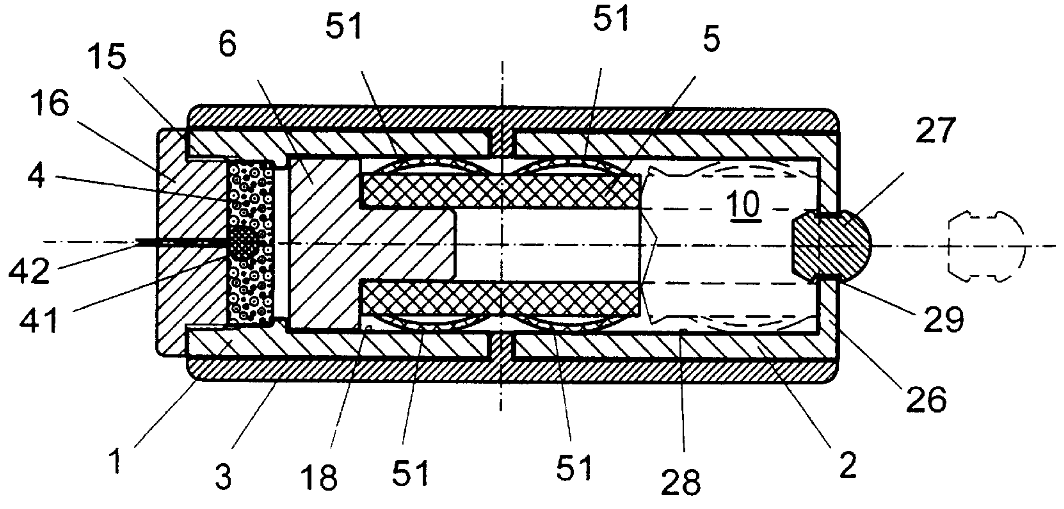
FIG. 1*a* is a section taken along the line I—I in FIG. 1 and viewed in the direction of the arrows.

Referring now to the figures of the drawing in detail and first, particularly, to FIGS. 1 and 1*a* thereof, there is seen a novel apparatus that comprises two spaced-apart cylindrical sleeves 1 and 2, which are made of electrically conductive material. The sleeve material may be a metal such as brass or bronze. The sleeves 1 and 2 are surrounded by a sheath 3 made of electrically nonconductive material, such as a plastic. By means of the sheath 3, the two sleeves 1 and 2 are mechanically joined together. However, since the two sleeves 1 and 2 are spaced apart, they are electrically insulated from one another.

Two terminals 11 and 12 protrude from the first sleeve 1 and serve to connect cables 13 and 14. Protruding from the second sleeve 2 are two terminals 21 and 22, which serve to connect cables 23 and 24.

The sleeve 1 is formed on its free end with a female thread 15, into which a closure cap 16 is screwed. The cap closes off the interior of the sleeve 1. Located inside the cap 16 is a pyrotechnical element 4. The element 4 has a fuse primer 41 connected to a cable 42 that leads to a sensor.

The second sleeve 2 is embodied on its free end with an end wall 26. The end wall 26 is formed with a bore 29 in which a stopper 27 is inserted. In the hollow chamber 10 enclosed by the two sleeves 1 and 2, there is a cylindrical switch element 5, which is embodied with contact springs 51 on its outside that contact the inside surfaces 18 and 28 of the two sleeves 1 and 2. A pressure plate 6 is also located between the pyrotechnical element 4 and the switch element 5.

The cable 13 is connected to the battery. The cable 23 leads to the starter unit. The cable 14 leads to an emergency power supply, and the cable 24 leads to the on-board electrical system of the motor vehicle.

In the position of the switch element 5 shown in FIGS. 1 and 1*a*, its contact springs 51 rest on the inside faces 18 and 28 of the two sleeves 1 and 2; as a result, the terminals 11,

12, 21 and 22 are electrically connected to one another. Hence all the appliances of the motor vehicle are connected to the battery. If the flow of current from the battery has to be interrupted because of an accident, then the sensor outputs a pulse over the line 42 to the primer 41 of the pyrotechnical element 4, causing the pyrotechnical element 4 to fire. By the resultant gas pressure, the switch element 5 is displaced to the right, out of the position shown in FIGS. 1 and 1*a*, via the pressure plate 6. As a result, a pressure rise ensues in the right-hand portion of the hollow chamber 10, which forces the stopper 27 out of the bore 29. As a result, the switch element 5 can be displaced into the position shown in dashed lines. Since the switch element 5 is now located only inside the second sleeve 2, the flow of current to the cables 23 and 24 is broken. By comparison, the flow of current to the cable 14 persists, so that an emergency power supply is assured.

Figure 2:
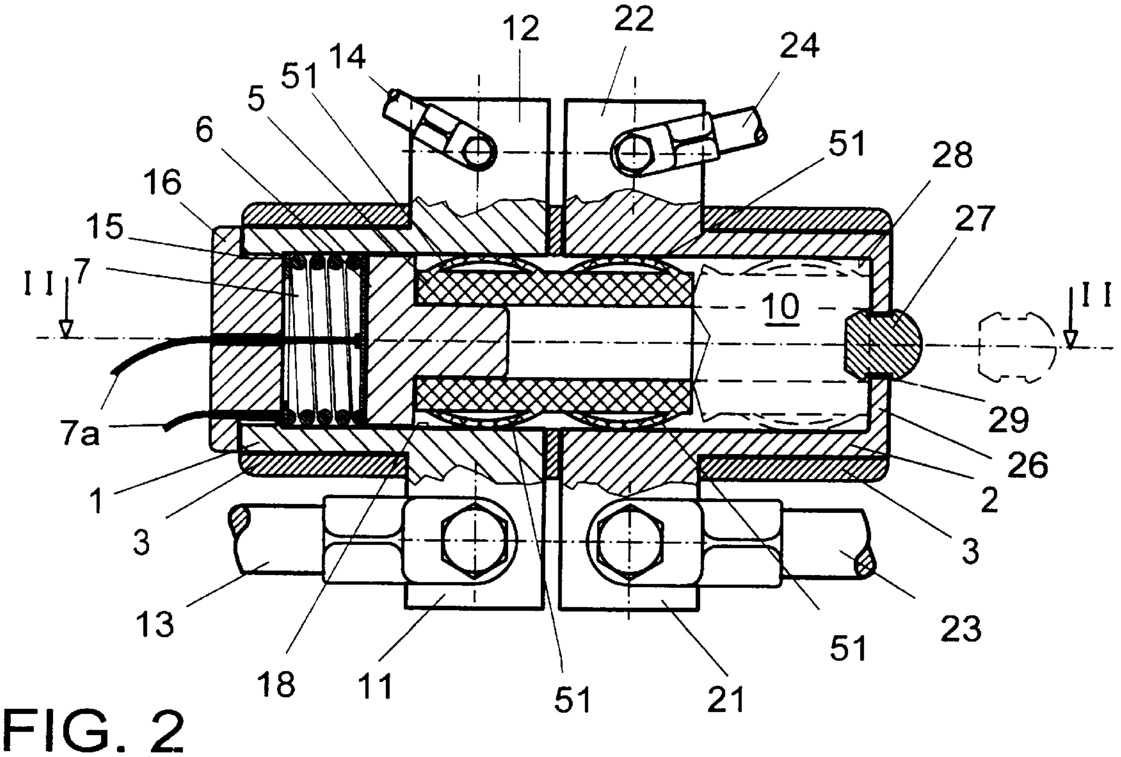
FIG. 2 is a front and axial-longitudinal sectional view of a second embodiment of an apparatus according to the invention.
Figure 2A:
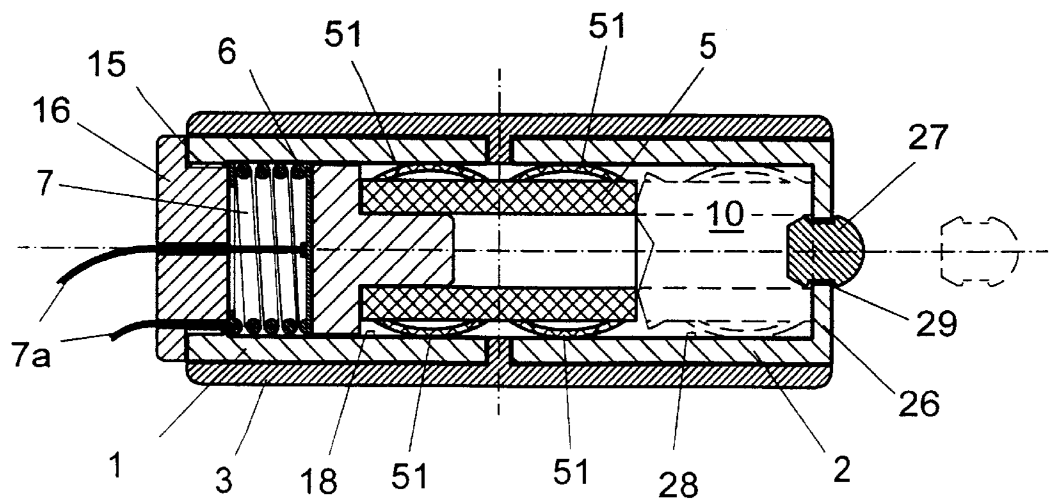
FIG. 2*a* is a section taken along the line II—II in FIG. 2 and viewed in the direction of the arrows.

In the exemplary embodiment of FIGS. 2 and 2*a*, a compression spring 7, which is retained in the taut position by a melting wire 7*a*, is provided as the control element for the switch element 5. As soon as the sensor responds, a current surge reaches the melting wire 7*a*, thereby melting it, so that the melting wire releases the compression spring 7, and as a result the switch element 5 is displaced into its right-hand position. The flow of current from the first sleeve 1 to the second sleeve 2 is thereby broken.

Figure 3:
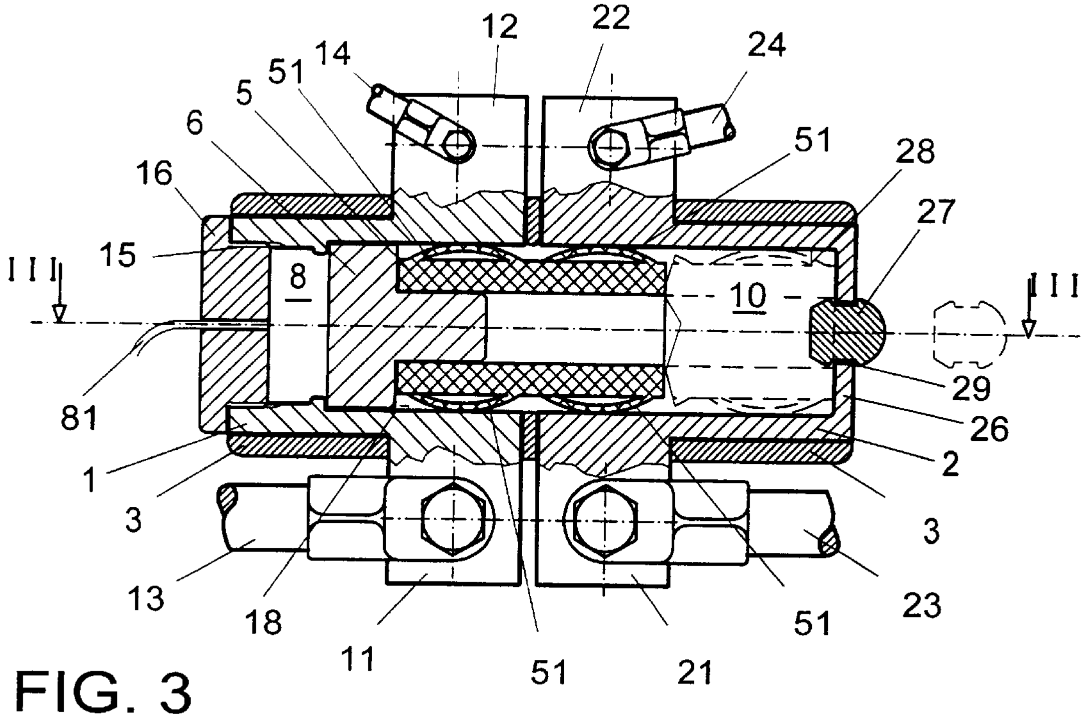
FIG. 3 is a front and axial-longitudinal sectional view of a third embodiment of an apparatus according to the invention.
Figure 3A:
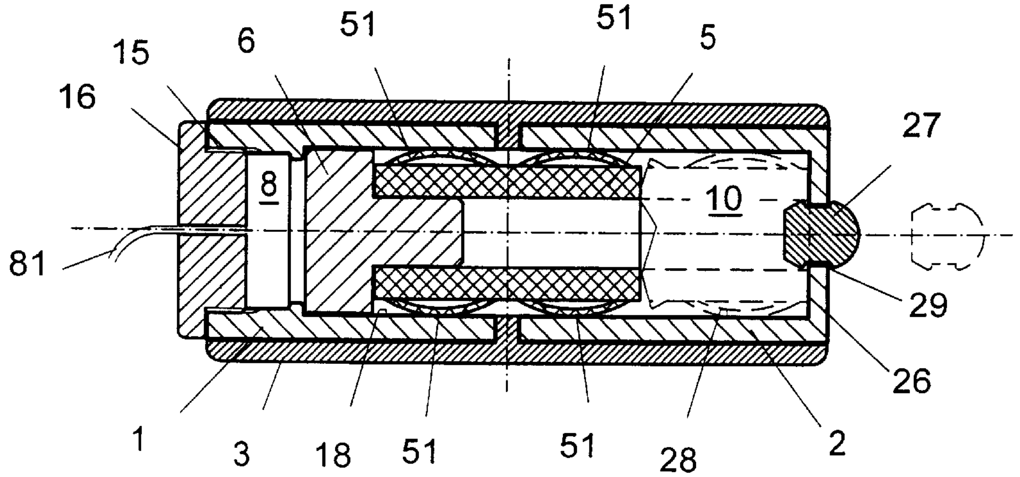
FIG. 3*a* is a section taken along the line III—III of FIG. 3 and viewed in the direction of the arrows.

In the exemplary embodiment of FIGS. 3 and 3*a*, a hollow chamber 8 is provided, which is connected via a line 81 to a pressure reservoir located outside the apparatus. As soon as the sensor responds, the hollow chamber 8 is acted upon from the pressure reservoir with a pressure medium, such as compressed air, causing the switch element 5 to be displaced into its nonconductive position.

To enable emergency operation after a displacement of the switch element 5 and despite the resultant interruption of the flow of current from the battery, the switch element 5 can be displaced back into its original position by means of a tool inserted through the bore 29, thereby reestablishing the electrical connection. To make the apparatus fully functional once again, the closure cap 16 is removed, and a new control element in the form of a pyrotechnical element 4 or a compression spring 7, is inserted into the first sleeve 1.

Figure 4:
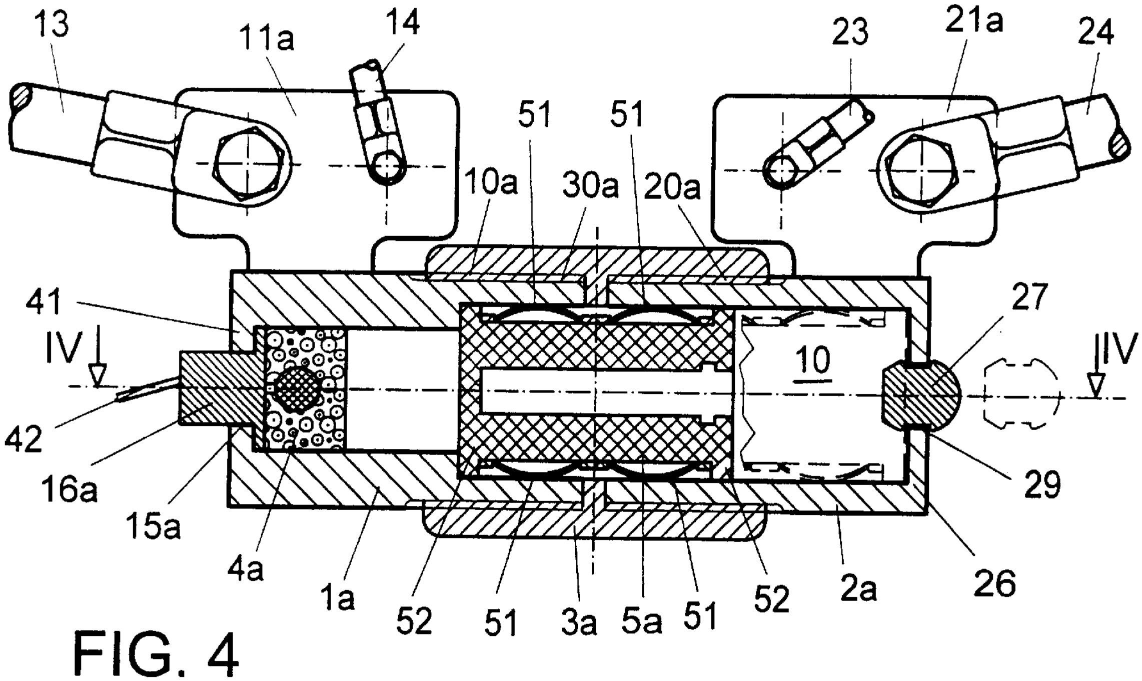
FIG. 4 is a front and axial-longitudinal sectional view of an embodiment that is modified in comparison with FIG. 1.
Figure 4A:
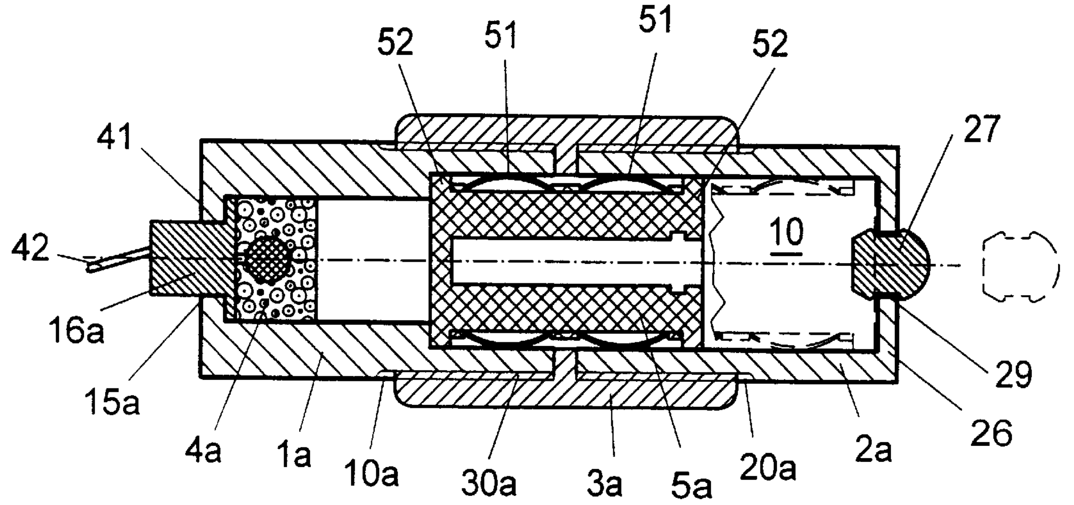
FIG. 4*a* is a section taken along the line IV—IV of FIG. 4 and viewed in the direction of the arrows.

The exemplary embodiment of FIGS. 4 and 4*a* differs from the exemplary embodiment of FIGS. 1 and 1*a* in that the two sleeves 1*a* and 2*a* are embodied, on the ends toward one another, with a respective male thread 10*a* and 20*a*. The sheath 3*a*, which is also a cylindrical sleeve, connects the two sleeves 1*a* and 2*a* mechanically, but insulates them from one another electrically. The sheath 3*a* is formed with two female threads 30*a*, into which the sleeves 1*a* and 2*a* are screwed. The pyrotechnical element 4*a* is also inserted into the sleeve 1*a* from the free end thereof, coming to rest on the inside of a closure wall 41 of the sleeve 1*a*. A closure cap 16*a* penetrates a bore 15*a* provided in the closure wall 41. The line 42 leading to the pyrotechnical element 4*a* is passed through the closure cap 16*a*.

Also, only two terminals 11*a* and 21*a* protrude from the free ends of the sleeves 1*a* and 2*a*, and the lines 13 and 14 are connected to one of these terminals while the lines 23 and 24 are connected to the other. In addition, the switch element disposed in the interior 10 of the two sleeves 1*a* and 2*a* is embodied as a sleeve 5*a* closed on all sides, whose end face toward the pyrotechnical element 4*a* forms the pressure plate onto which the pyrotechnical element 4*a* acts. Finally, the switch element 5*a* is formed with radially outward-protruding annular flanges 52 on both of its ends. The flanges define a hollow cylindrical chamber in which the contact springs 51 are disposed.

The mode of operation of the apparatus of FIGS. 4 and 4*a* is the same as that of the apparatus of FIGS. 1 and 1*a*.

Figure 5:
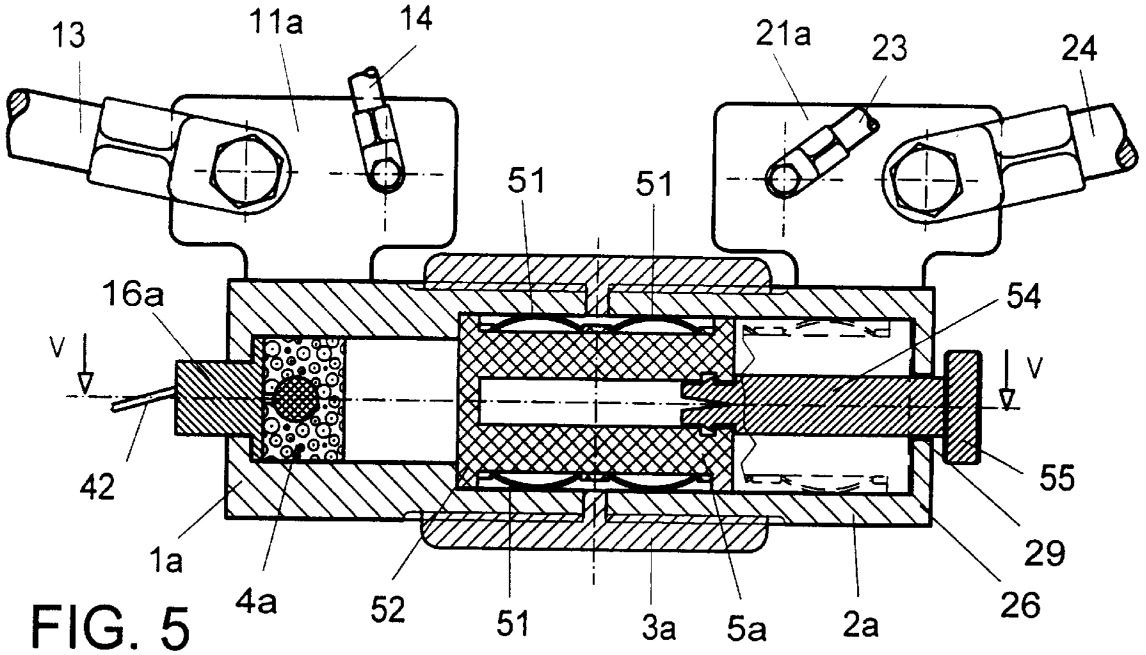
FIG. 5 is a front and axial-longitudinal sectional view of a further modification of the embodiment of FIG. 4.
Figure 5A:
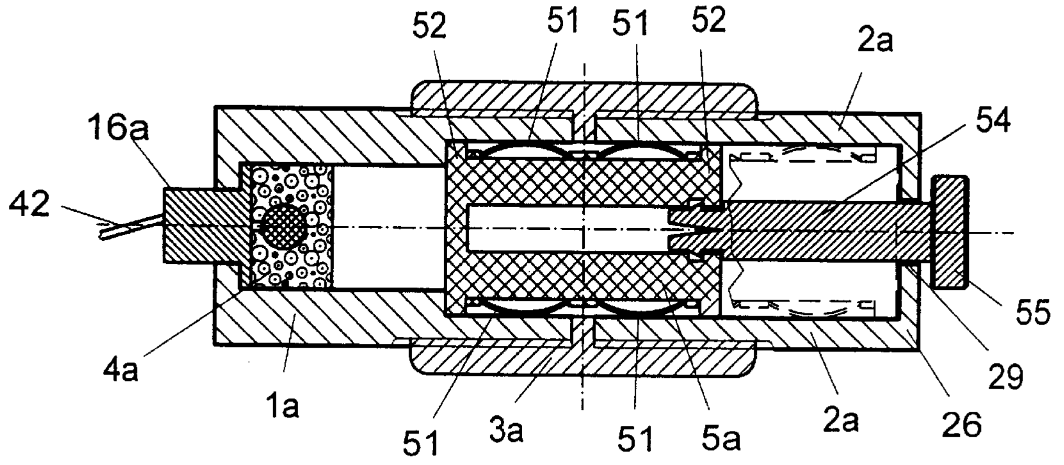
FIG. 5*a* is a section taken along the line V—V of FIG. 5 and viewed in the direction of the arrows.

The apparatus of FIGS. 5 and 5*a* pertains to a feature of the apparatus of FIGS. 4 and 4*a*, in that a bolt 54 made of an insulating material, in particular plastic, is inserted into the switch element 5*a*, penetrating the bore 29; on its free end located outside the sleeve 2*a*, it is embodied with a handle, in the form of a disk or knob 55. The bolt 54 is coupled for slaved motion to the switch element 5*a* by positive engagement (form lock).

The purpose of this embodiment is so that this apparatus can thereby be used as a general switch as well, so that the switch element 5*a* by means of the bolt 54 can be displaced manually into the off position, thereby breaking the flow of current from the battery to the consumers. Moreover, once the switch element 5*a* has been displaced into its nonconductive position by means of the pyrotechnical element 4*a*, it can be displaced back into its conductive position in order to maintain the power supply.

Figure 6:
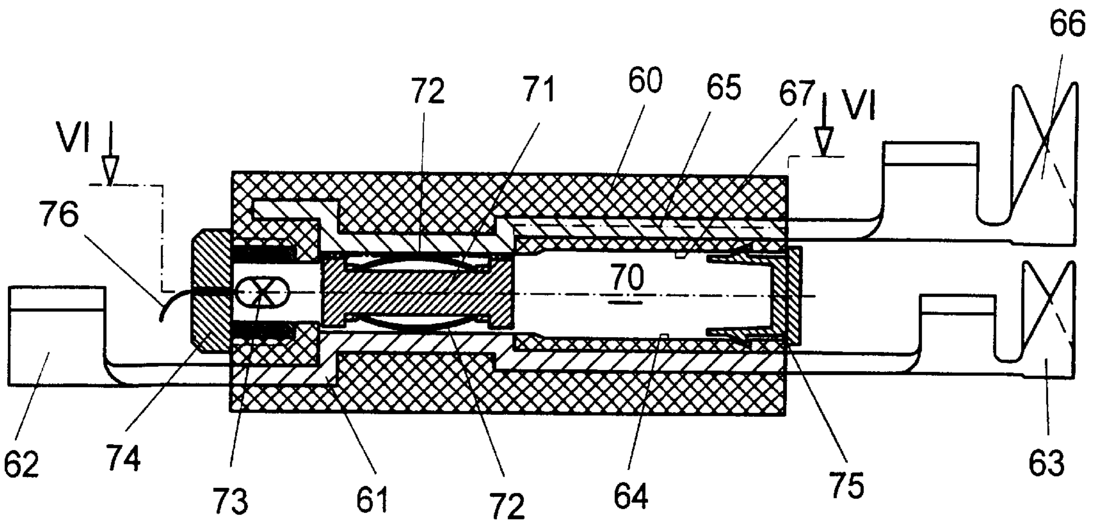
FIG. 6 is a vertical longitudinal section of a fourth embodiment of the apparatus according to the invention.
Figure 6A:
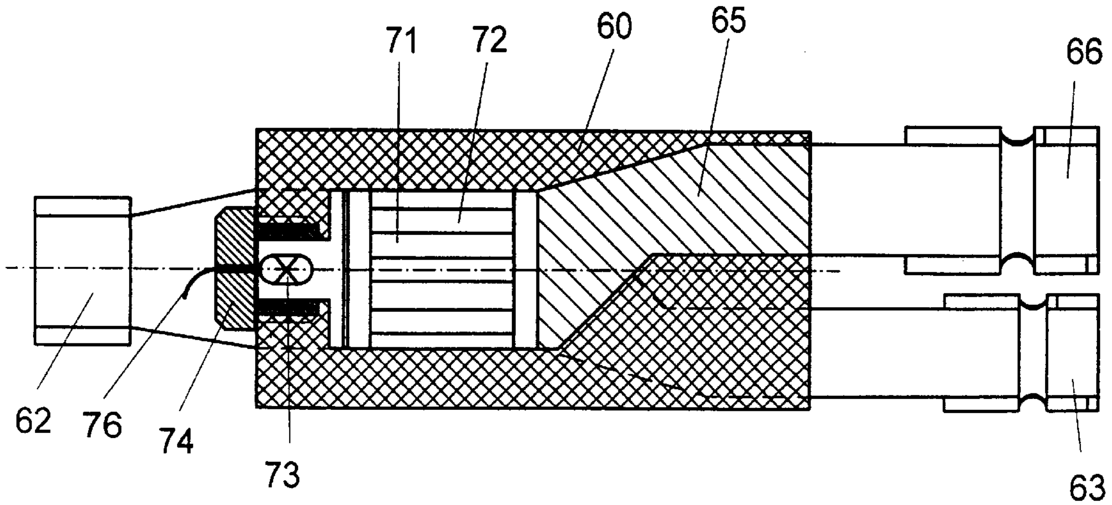
FIG. 6*a* is a section taken along the line VI—VI of FIG. 6 and viewed in the direction of the arrows.

In FIGS. 6 and 6*a*, a simplified embodiment is also shown, which comprises a square housing 60 of electrically insulating material, in which two rails 61 and 65, made from electrically conductive material are disposed, with a hollow chamber 70 located between the. Disposed in the hollow chamber 70 is a switch element 71, which can be displaced from a first position into a second position by means of a pyrotechnical element 73. The switch element 71 is embodied with contact springs 72, which in the first position of the switch element 71 rest on the two rails 61 and 65. By comparison, in a further portion of the hollow chamber 70, the rails 61 and 65 are embodied with insulating overlays 64 and 67, as a result of which in this portion the contact springs 72 are electrically insulated from the rails 61 and 65. The pyrotechnical element 73 is inserted from the left into the hollow chamber 70 and is retained in the hollow chamber 70 by a stopper 74. The stopper 74 is penetrated by the cable 76 leading to the pyrotechnical element.

The rail 61, which passes all the way through the housing 60, is embodied on both of its ends located outside the housing 60 with connection lugs 62 and 63. By comparison, the rail 65 extends only on its right-hand end out of the housing 60, and is embodied there with a connection lug 66. The line leading from the battery is connected to the connection lug 62. The emergency power supply is connected to the connection lug 63, and the electrical consumers of the motor vehicle are connected to the connection lug 66. The hollow chamber 70 is closed off by means of a stopper 75.

In the position of the switch element 71 shown in FIG. 6, the two rails 61 and 65 are electrically connected to one another via the contact springs 72, and as a result the connection lug 66 to which the consumers are connected is also electrically connected to the connection lug 62. If by comparison the switch element 71 has been displaced by the pyrotechnical element 73 into the right-hand portion of the hollow chamber 70, then the electrical connection is interrupted by the insulating overlays 64 and 67, and as a result only the connection lug 63 to which the emergency power supply is connected remains electrically connected to the connection lug 62.

Accordingly, firing of the pyrotechnical element 73, by which a displacement of the switch element 71 from its conductive position to its nonconductive position is effected, interrupts the power supply.

Figure 7:
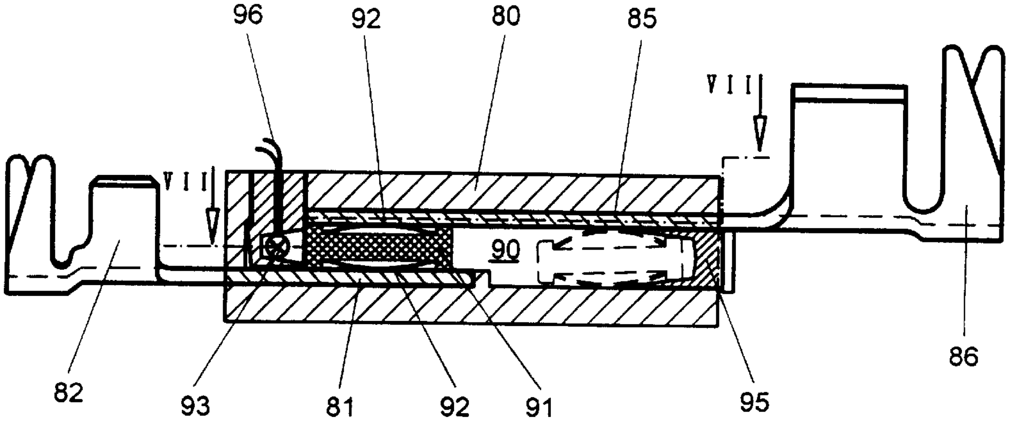
FIG. 7 is a vertical longitudinal sectional view of a modification of the embodiment of FIGS. 6 and 6*a;*
Figure 7A:
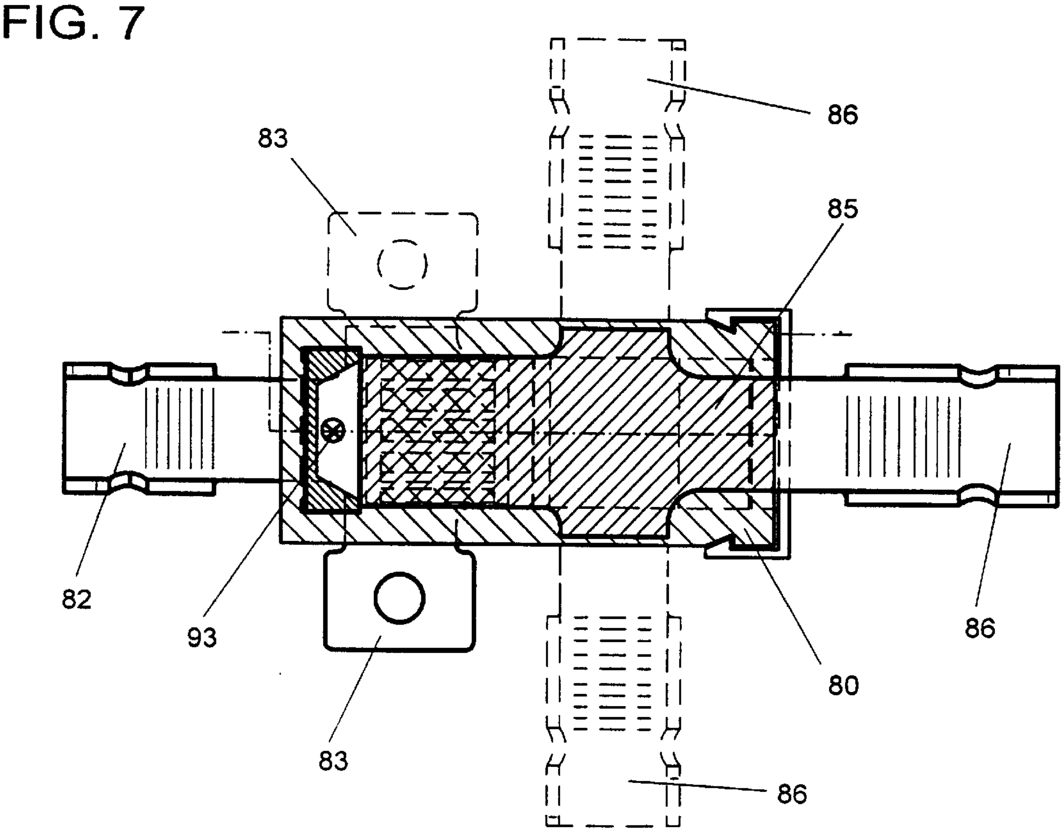
FIG. 7*a* is a partly phantom and partly sectional view taken along the line VII—VII of FIG. 7 and viewed in the direction of the arrows.

In FIGS. 7 and 7*a*, an embodiment is also shown that is modified compared with the embodiment of FIGS. 6 and 6*a* and which again comprises a square housing 80 of electrically insulating material, in which two rails 81 and 85, made from electrically conductive material are disposed, with a hollow chamber 90 located between them. Disposed in the hollow chamber 90 is a switch element 91, which can be displaced from a first position into a second position by means of a pyrotechnical element 93. The switch element 91 is embodied with contact springs 92, which in the first position of the switch element 91 rest on the two rails 81 and 85. By comparison, in a further portion of the hollow chamber 90 the rail 81 is not extended, and as a result in this portion the lower contact springs 92 do not rest on the rail 81. The pyrotechnical element 93 is inserted from above into the hollow chamber 90. Lines 96 leading to the pyrotechnical element 81 are also provided.

The left-hand rail 81, which extends approximately to the middle of the housing 80, is embodied, on its end located outside the housing 80, with a connection lug 82. It is also embodied with a connection lug 83 protruding transversely. On its right-hand end, the rail 85 is extended out of the housing 80, and it is embodied there with a connection lug 86. The line leading from the battery is connected to the connection lug 82. The emergency power supply is connected to the connection lug 83, and the electrical consumers of the motor vehicle are connected to the connection lug 86. The hollow chamber 70 is closed off by means of a stopper 95.

In the position of the switch element 91 shown in FIG. 7, the two rails 81 and 85 are electrically connected to one another via the contact springs 92, and as a result the connection lug 86 to which the consumers are connected is also electrically connected to the connection lug 82. If by comparison the switch element 91 has been displaced by the pyrotechnical element 93 into the right-hand portion of the hollow chamber 90, then the electrical connection is interrupted, and as a result only the connection lug 83 to which the emergency power supply is connected remains electrically connected to the connection lug 82.

Accordingly, firing of the pyrotechnical element 93, by which a displacement of the switch element 91 from its conductive position to its nonconductive position is effected, interrupts the power supply.

As also shown in dashed lines in FIG. 7, the connection lug 83 for the emergency power supply may also be disposed on the other side of the housing 80, and the connection lug 86 for the consumers can protrude at a right angle from the rail 85.

Figure 8:
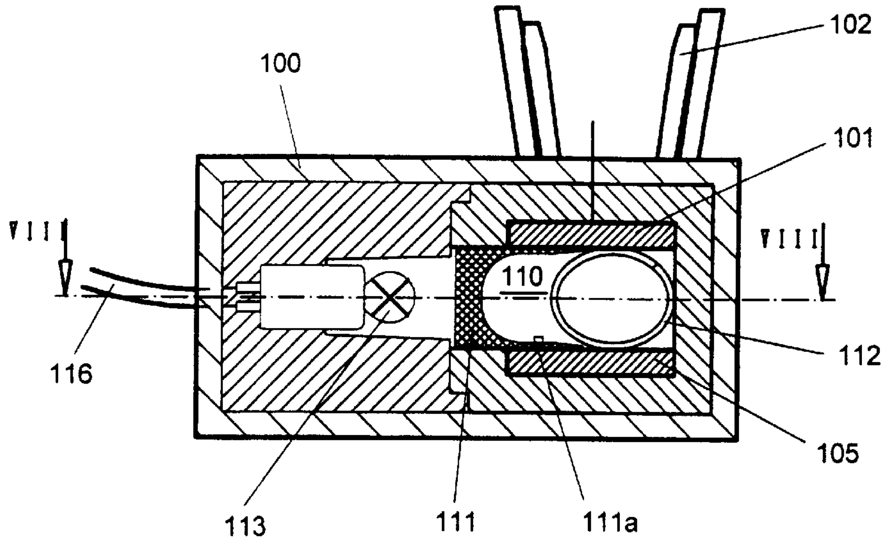
FIG. 8 is a vertical longitudinal section of a fifth embodiment of the apparatus according to the invention.
Figure 8A:
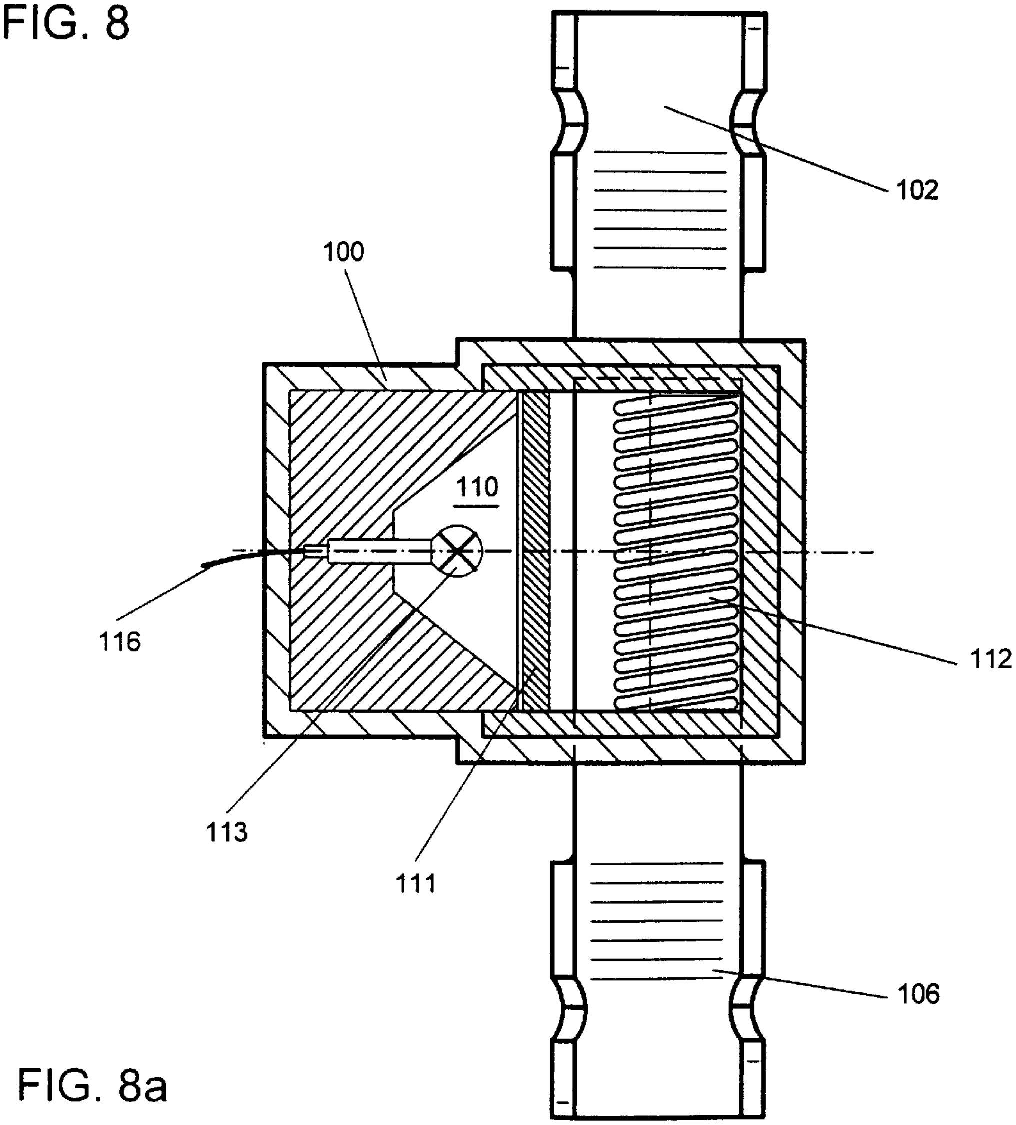
FIG. 8*a* is a section taken along the line VIII—VIII of FIG. 8.

In FIGS. 8 and 8*a*, an embodiment of an apparatus according to the invention is also shown, which has a square housing 100 with a hollow chamber 110. A pyrotechnical element 113 which be can be tripped via lines 116 is located in the hollow chamber 110. Two rails 101 and 105 are located on the upper and lower side walls of the hollow chamber 110; they lead to the outside on both sides of the housing 100 and are embodied outside the housing 100 with connection lugs 102 and 106. The battery and of the emergency power supply are connected to the connection lug 102. The electrical supply to the motor vehicle is connected to the connection lug 106. A switch element 112 in the form of a helical spring, made of electrically conductive material, is also located between the two rails 101 and 105. This switch element 112 is assigned an insulating element 111, which is embodied with vanes 111*a* that can be inserted between the switch element 111 and the rails 101 and 105.

As soon as the pyrotechnical element 113 has been fired via the lines 116, the resultant gas pressure displaces the insulating element 111 to the right. As a result, the vanes 111*a* of the insulating element 111 are inserted between the switch element 112 and the rails 101 and 105, thereby interrupting the flow of current between the connection lugs 102 and 106.

Figure 9:
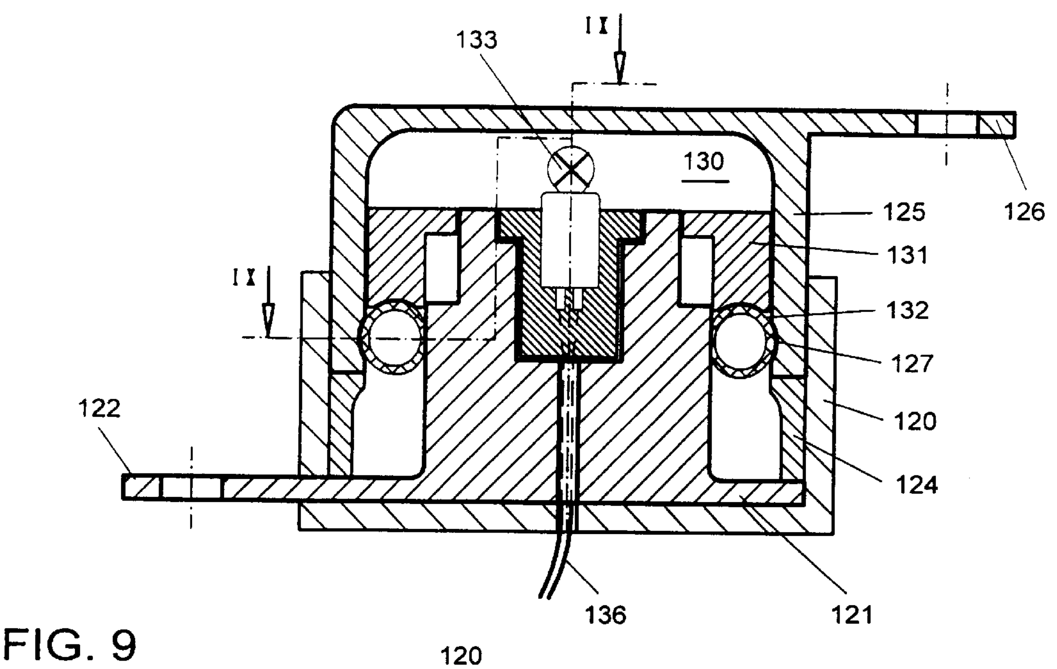
FIG. 9 is a vertical section through a sixth embodiment of an apparatus according to the invention.
Figure 9A:
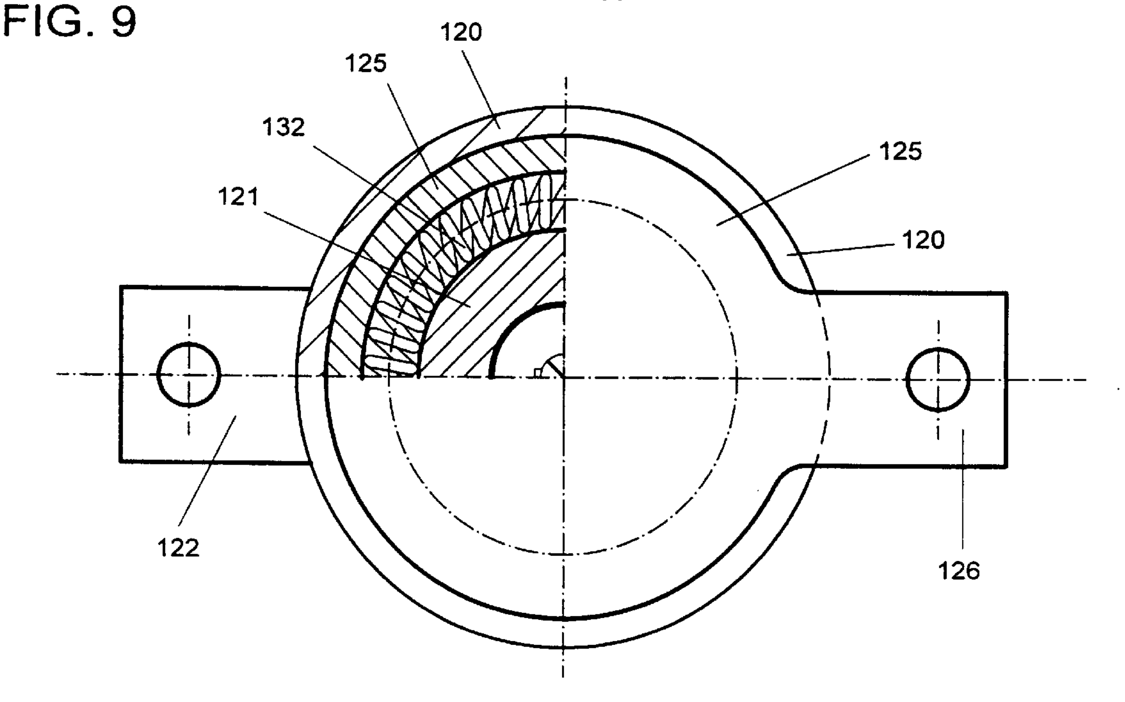
FIG. 9*a* is a partly frontal and partly sectional view (along the line IX—IX) of the embodiment of FIG. 9.

The further embodiment of an apparatus of the invention shown in FIGS. 9 and 9*a* comprises a cylindrical first housing part 120 of insulating material, into which a hollow-cylindrical housing part 125 that is embodied with a connection lug 126 is inserted. The two housing parts 120 and 125 surround a hollow chamber 130, in which a cylindrical body 121, made of electrically conductive material, is located. A connection lug 122 that passes through the housing part 120 projects from the cylindrical body 121. A recess into which a pyrotechnical element 133 is inserted is located in the cylindrical body 121. Ignition lines 136 are connected to the pyrotechnical element 133. Located outside the cylindrical body 121 is a ring 131, made of insulating material, to which a switch element in the form of a toroidal helical spring 132 is assigned; this spring is retained in a groove 127 disposed on the inside face of the housing part 125. A ring 124 made of insulating material is also located between the hollow-cylindrical housing part 125 and the housing part 120; by means of this ring, the cylindrical part 121 and the hollow-cylindrical housing part 125 are electrically insulated from one another.

In the position shown in FIG. 9, the connection lug 126 is connected to the connection lug 122 via the hollow-cylindrical housing part 125, the switch element 132, and the cylindrical part 121. As soon as the pyrotechnical element 133 has been ignited, the ring 131 is displaced downward by the gas pressure generated in the hollow chamber 130, and as a result the switch element 132 is displaced into the region of the insulating sleeve 124. As a result, the connection lug 126 is electrically insulated from the connection lug 122.

It will also be noted that in the embodiments of FIGS. 4–9 as well, the control element may be formed by a compression spring or by a pressure medium supplied from outside. The ignition of the pyrotechnical element may be tripped by a sensor which responds to impacts caused by an accident.

Figure 10:
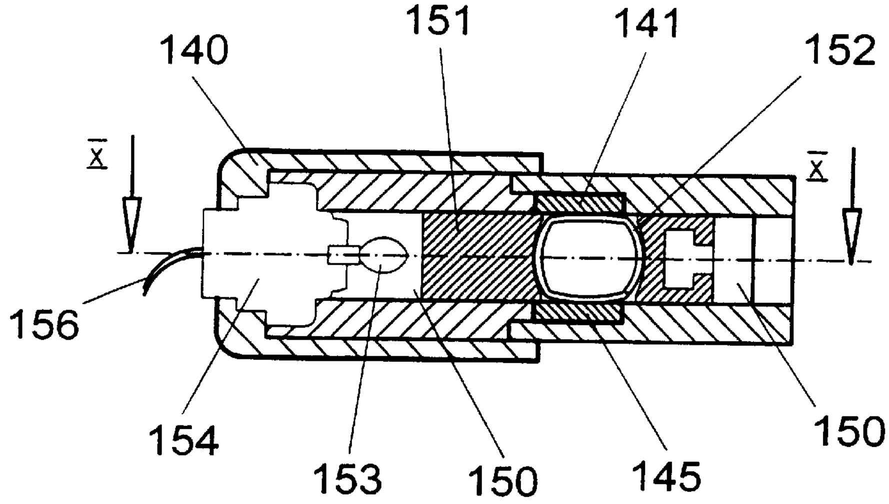
FIG. 10 is a vertical sectional view of a seventh embodiment of the apparatus according to the invention.
Figure 10A:
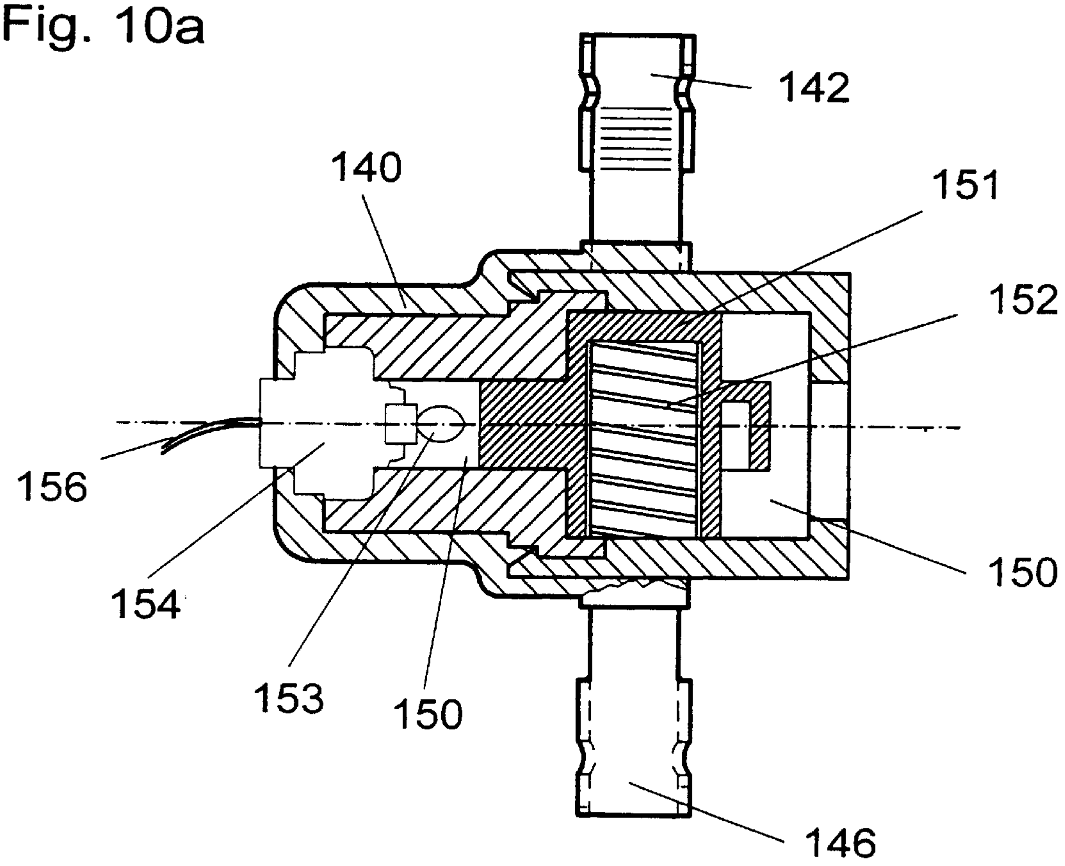
FIG. 10*a* is a front view and a section taken along the line X—X in FIG. 10.

FIGS. 10 and 10*a* show a further embodiment of an apparatus according to the invention, which has a square housing 140 made of insulating material with a hollow chamber 150. A pyrotechnical element 153 which can be tripped via lines 156 is located in the hollow chamber 150. At one of its ends, the hollow chamber 150 is sealed by a cap 154. Two rails 141 and 145 are located on the upper and lower side walls of the hollow chamber 150, are routed to the outside on both sides of the housing 140, and are designed outside the housing 140 with connection lugs 142 and 146. The battery and the emergency power supply are connected to the connection lug 142. The electrical supply to the motor vehicle is connected to the connection lug 146. A switch element 152 in the form of a helical spring and made of electrically conductive material is also located between the two rails 141 and 145. This switch element 152 is located inside a piston 151, said piston being made of insulating material, being arranged in the hollow chamber 150, and being displaceable relative to the rails 141 and 145. In the starting position shown in FIGS. 10 and 10*a*, the switch element 152 is in contact with the two rails 141 and 145, thereby electrically connecting the latter to one another.

As soon as the pyrotechnical element 153 has been fired via the lines 156, the resultant gas pressure displaces the piston 151 having the switch element 152 to the right. As a result, the switch element 152 is isolated from the rails 141 and 145, thereby interrupting the flow of current between the connection lugs 142 and 146.

Figure 11:
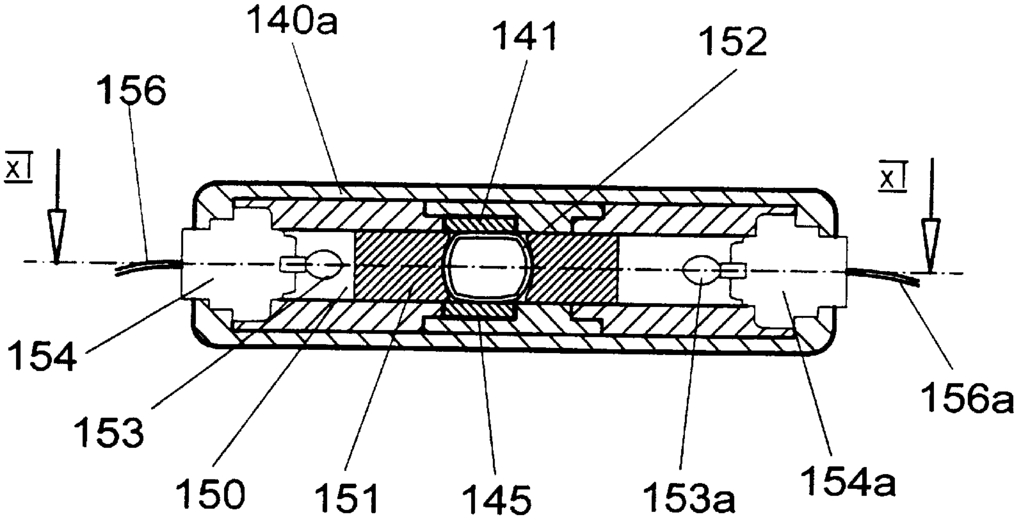
FIG. 11 is a vertical section through an embodiment that is expanded compared with the embodiment of FIG. 10.
Figure 11A:
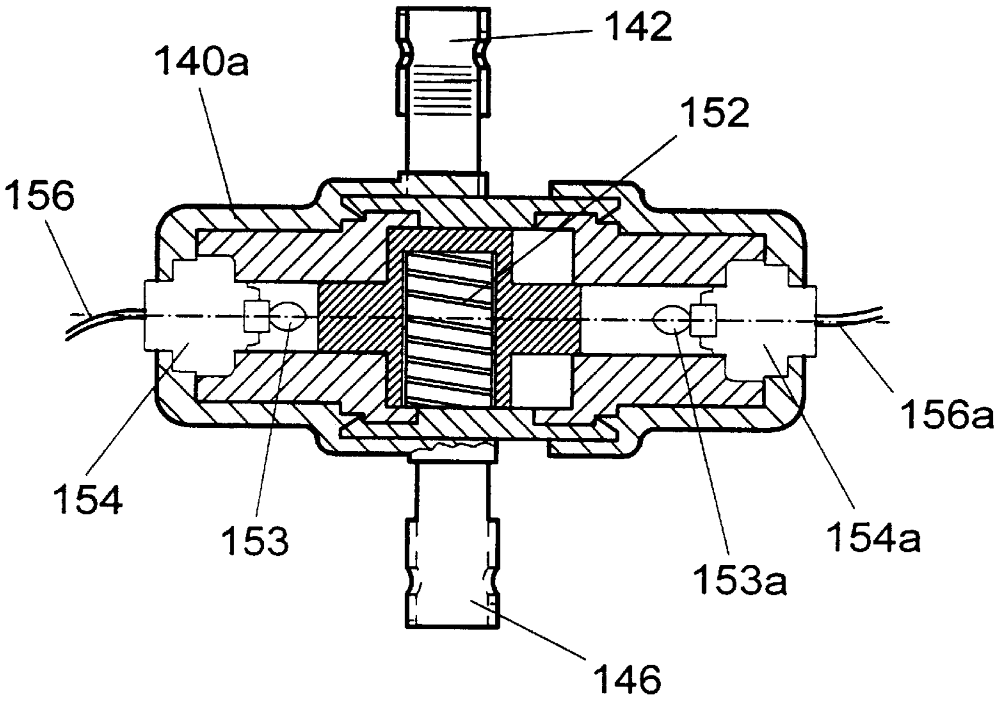
FIG. 11*a* is a front view and section taken along the line XI—XI of FIG. 11.

The embodiment shown in FIGS. 11 and 11*a* differs from the embodiment shown in FIGS. 10 and 10*a* in that the housing 140*a* is symmetrical in design to such an extent that pyrotechnical elements 153 and 153*a*, which can be fired via lines 156 and 156*a*, are arranged at both ends of the hollow chamber 150, which is sealed by caps 154 and 154*a*. In this case, the piston 151 in the hollow chamber 150 is displaced in both directions by means of, in each case, one of the pyrotechnical elements 153 and 153*a*, respectively, thereby interrupting the flow of current between the connection lugs 142 and 146 as well as switching it on again by means of the pyrotechnical elements 153 and 153*a*.

I claim:

1. An apparatus for interrupting a current flow in an electrical cable connecting a motor vehicle battery to a consumer in the motor vehicle, comprising:

a housing connected in-line in an electrical cable and forming a mechanical connection between respective ends of the cable, said housing being formed with terminals which are electrically insulated from one another and at which the respective ends of the cable are connected;

a control device disposed in said housing, said control device electrically connecting the two ends of the cable and being adapted to selectively isolate the two ends from one another;

a switch disposed inside said housing and being actuatable by said control device for selectively electrically connecting and disconnecting said two connection terminals without interrupting the mechanical connection between the two ends of the cable.

2. The apparatus according to claim 1, wherein said control device is a pyrotechnical element which, upon an ignition thereof, actuates said switch.

3. The apparatus according to claim 1, wherein said control device is a compression spring, and including a meltable wire retaining said spring in a taut position, said meltable wire releasing said spring when a current passes therethrough.

4. The apparatus according to claim 1, wherein said control device is a cylinder and piston unit adapted to be tripped by imposition of a compressed gas.

5. The apparatus according to claim 1, wherein the housing is embodied with a hollow chamber which is in particular cylindrical and on one end of which said control device is disposed, and in which two contacts, connected to the connection terminals, and a piston-like switch element, which is displaceable by means of said control device inside the hollow chamber relative to the contacts, are located.

6. The apparatus according to claim 1, wherein said housing comprises two sleeves, electrically insulated from one another and each formed of electrically conductive material, each of said two sleeves having formed thereon at least one of said connection terminals and defining therein a hollow chamber.

7. The apparatus according to claim 1, wherein said housing is formed with two cylindrical tube segments each formed with at least one of said connection terminals, and including a sheath of plastic material mechanically joining and electrically insulating said tube segments from one another.

8. The apparatus according to claim 5, which further comprises contact springs formed on an outside of said piston-like switch element.

9. The apparatus according to claim 1, which comprises a pressure plate disposed between said control device and said switch for transmitting a thrust generated by said control device to said switch.

10. The apparatus according to claim 1, wherein said housing includes a face end having formed therein an opening for inserting said control device into said housing, and including a detachably secured cover cap closing said opening.

11. The apparatus according to claim 1, wherein the housing defines a hollow chamber with a first portion and a second portion, and including two mutually spaced-apart rails, said rails being electrically connected to one another in said first portion of said hollow chamber via a switch element, and being electrically insulated from said switch element in said second portion.

12. The apparatus according to claim 11, wherein said rails outside said housing are formed as connection lugs.

13. The apparatus according to claim 1, wherein said housing is formed with two mutually spaced-apart rails between which said switch element is disposed, and including an insulating element assigned to said switch element, said insulating element being disposed so as to be displaceable by said control device for electrically insulating said switch element from said rails.

14. The apparatus according to claim 13, wherein said switch element is a helical spring, and said insulating element is insertable between said switch element and said rails.

15. The apparatus according to claim 14, wherein said switch element is formed with vanes disposed so as to be insertable between said rails and said switch element.

16. The apparatus according to claim 1, wherein said housing comprises two hollow cylindrical housing parts, and one said housing part is formed with a first connection lug; including a cylindrical body disposed inside said housing and embodied with a second connection lug; and wherein said switch element is disposed between said cylindrical body and said housing part formed with said connection lug, said switch element being adjustable by said control element from a position electrically connecting said cylindrical body and said housing part formed with said connection lug into a position electrically insulating said cylindrical body from said housing part formed with said connection lug.

17. The apparatus according to claim 15, wherein said switch element is a toroidal helical spring.

18. The apparatus according to claim 16, wherein said cylindrical body is formed with a radially protruding flange, and including a sleeve of insulating material disposed between said housing part formed with said connection lug and said radially protruding flange.

19. The apparatus according to claim 16, wherein said housing part formed with said connection lug includes an inner wall having a groove formed therein, and said switch element is retained by said groove in an electrically conductive position.

20. The apparatus according to claim 1, wherein said switch element is a helical spring arranged in a piston-type control element of electrically insulating material, said housing being formed with contacts on an inside thereof and connected to said connection lugs, and wherein said switch element bears against said contacts when said piston-type control element is in a first position, and said switch element is isolated from said contacts when said control element is in a second position.

21. The apparatus according to claim 20, wherein said contacts delimit a hollow chamber formed inside said housing, and said contacts are routed out through sides of said housing and form connection lugs at the sides of said housing.

22. The apparatus according to claim 20, wherein said housing has two ends and said control element is one of two control elements each disposed at a respective one of said ends, said control elements being disposed so as to selectively displace said switch element into two switch positions.

23. The apparatus according to claim 22, wherein said control elements are pyrotechnical elements.

24. An apparatus for interrupting a current flow in an electrical cable, comprising:

a housing connected in-line in an electrical cable and mechanically connecting two ends of the cable, said housing being formed with terminals respectively connected to the two ends of the cable, and defining a gap therein electrically isolating the two ends from one another;

a switch element disposed in said gap for electrically connecting the two ends of the cable and being adapted to selectively move out of said gap to electrically isolate the two ends from one another; and a control device disposed in said housing to selectively move said switch element out of said gap for electrically disconnecting said two connection terminals.

* * * * *